Nov. 26, 1935.  M. J. GALVIN  2,022,194

MINER'S DRILL BIT AND OTHER TOOL

Original Filed Oct. 28, 1933

INVENTOR
M. J. GALVIN
By Fetherstonhaugh & Co.

Attorneys

Patented Nov. 26, 1935

2,022,194

UNITED STATES PATENT OFFICE 2,022,194

MINER'S DRILL BIT AND OTHER TOOLS

Michael Joseph Galvin, Toronto, Ontario, Canada

Application October 28, 1933, Serial No. 695,583.
Renewed October 15, 1935. In Canada July 13, 1933

2 Claims. (Cl. 255—64)

My invention relates to improvements in miners'. drill bits and other tools, and the object of the invention is to devise a bit or tool of this type the life of which is materially increased by providing a plurality of cutting edges which may be readily interchanged as each edge becomes worn, by providing separable cutting portions of very high grade material thus permitting the use of low grade material for the body of the bit or tool thereby decreasing the cost of manufacture of the bit or tool as a whole, by which a tool having high grade cutting portions having interchangeable cutting edges are available and renewable in remote places without cost and without the excessive transportation costs hitherto necessary when the whole bit had to be discarded and replaced when worn out, and by which uniformity in the high quality of the material forming the cutting edge is ensured and the necessity for sharpening at the mine eliminated, and it consists essentially of the arrangement and construction of parts as hereinafter more particularly explained.

In the drawing like characters of reference indicate corresponding parts in each figure.

Referring to Figs. 1 to 4.

1 is a prism like insert formed of a very high grade of material equilaterally triangular in cross section to form three cutting edges $1^x$, $1^o$ and $1'$.

2 is the bit base which may be formed integral with the steel shank $2^x$ which commonly carries the bit and which is provided with the usual centre orifice $2^o$ forming the water duct. This portion of the drill may be formed of comparatively cheap low grade material.

The end of the base 2 is provided with a transverse groove 3, the base of the insert 1 fitting against the base of the groove, the sides $3^x$ of the groove being undercut so that the inclination of their inner faces conform to the inclination of the sides of the equilaterally triangular insert. The ends of the groove are open so as to permit of the insert being slipped longitudinally thereinto.

The angles of the groove are recessed as at $3^o$ so as to protect the sharp cutting edges of the insert so that they will not be dulled by contact with the walls of the recess.

Figure 2:
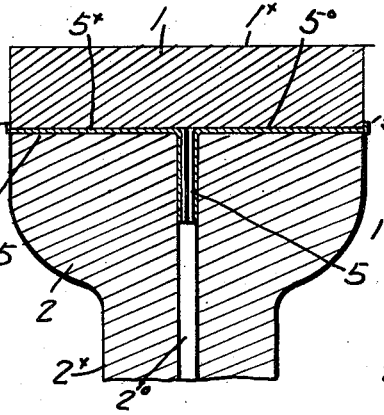
Fig. 2 is a longitudinal section through Fig. 1.
Figure 4:
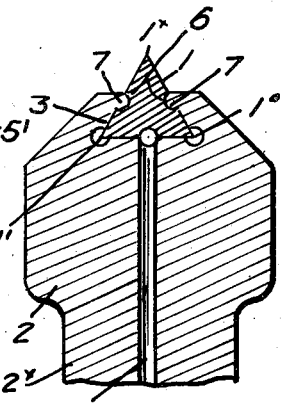
Fig. 4 is a transverse sectional view showing a slight modification.

In order to hold the insert from longitudinal movement I provide a split tube 5 which is sprung into the channel $2^o$, the upper end of the tube being split to form tongues $5^x$ and $5^o$ which are flattened and bent to tie in the bottom of the channel 2 beneath the insert 1 as shown in Fig. 2, the extreme ends of the tongue being bent up against the ends of the insert to hold it in place against longitudinal movement as indicated at $5'$. In order to further support the insert 1 the side walls thereof may be grooved as indicated at 6 and the side walls of the recess provided with projections 7, see Fig. 4.

If desired the insert may move freely longitudinally to a limited extent in either direction by providing each side wall of the insert with a longitudinal groove 8 of less length than the length of the insert and into which extends projections 9 from the sides of the groove 3 which are of less length than the grooves of the insert and slidably fitting therein. After the insert is placed in position the edges of the groove 3 are hammered into the grooves 8 thereby forming projections 9 extending into the groove and of less length than the grooves so as to permit free longitudinal movement of the insert in the grooves.

Figure 5:
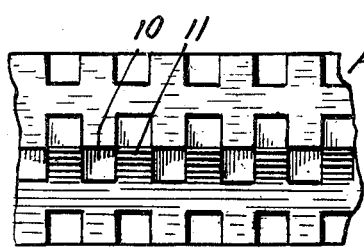
Fig. 5 is a fragmentary portion of my drill bit insert showing a cutting edge formed serrated, the serrations being chisel shaped.
Figure 6:
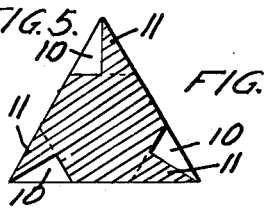
Fig. 6 is a transverse sectional view through Fig. 5.

Referring to Figs. 5 and 6: In these figures I show an alternative form of insert in which the cutting edges are formed by a series of chisel shaped projections 10 and 11 arranged alternately on each side of the cutting centre with their vertical faces directed inward. By this means a serrated edge is formed having a greater cutting power than the straight edge.

Figure 7:
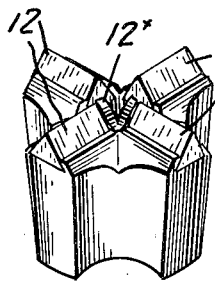
Fig. 7 is a perspective view of a rose bit showing my construction applied thereto.
Figure 8:
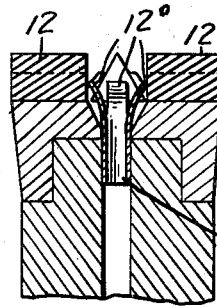
Fig. 8 is a sectional view through Fig. 7.

Referring to Figs. 7 and 8, I show my construction applied to a rose bit. In this form the inserts are set radially at the end of the bit as is commonly done in this form and are pressed outward by means of a split tube having the end split to form spring tongues $12^x$ pressing against the inner end of each insert.

Figure 9:
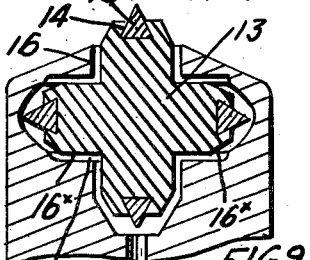
Fig. 9 illustrates a modified form in which four inserts are employed.

Referring to Fig. 9: In this figure I show a modification in which twelve cutting edges are provided which may be brought successively into operation as each cutting edge becomes worn. In this form I employ an insert supporting body 13 in the form of a cross in cross section, the end of each arm being provided with an insert receiving groove 14 of the form already described and in which the triangular inserts 15 are fitted. The receiving groove 16 in the drill body is also in the form of a cross providing a horizontal bearing face 16ˣ at each side of the drill centre on which the horizontal arms of the cross bear.

Water channels 17 are formed in the groove to convey water from the main channel 18 to the cutting edge in operation.

Figure 10:
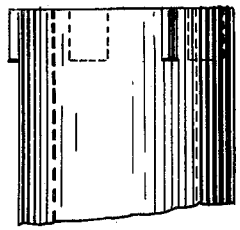
Fig. 10 is a side elevation of a core drill showing my construction applied thereto.
Figure 1:
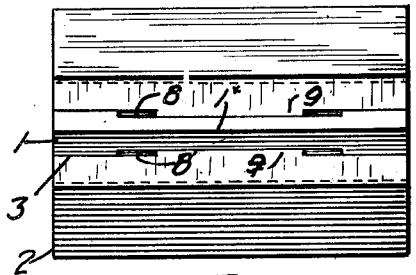
Fig. 1 is a plan view of my drill bit.
Figure 11:
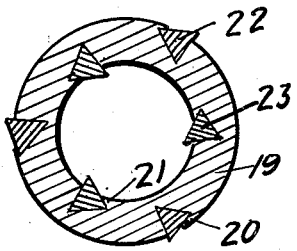
Fig. 11 is a plan view of Fig. 10.
Figure 3:
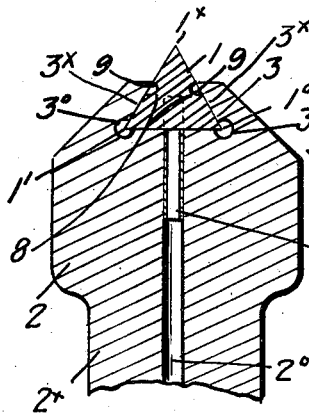
Fig. 3 is a transverse section through Fig. 1.

Referring to Figs. 10 and 11: In these figures I show my construction adapted to core bits. In this construction 19 is a tubular body having longitudinal grooves 20 and 21 on its outer and inner faces adapted to receive the triangular inserts 22 and 23 to cut interiorly and exteriorly.

From this description it will be seen that I have devised a tool or bit which provides a plurality of cutting edges which may be used successively as each cutting edge becomes worn, which permits the employment of a very high grade of material for the cutting edges without increasing the cost of the bit as a whole, which does not entail having transportation costs for renewals which is of particular advantage in remote places where there are no facilities for making bits for replacement.

Although I have shown the insert 1 with flat sides it may be formed with convex or concave sides if found desirable.

What I claim as my invention is:

1. A cutting member for cutting tools comprising a bar equilaterally triangular in cross section and having a serrated cutting edge formed by a series of chisel shaped projections set alternately in each side of the cutting line with their vertical faces directed inward.

2. In a cutting tool, a cutting member having a plurality of cutting edges, a tool body having an undercut grooved end into which the cutting member is inserted longitudinally to extend beneath the undercut sides of the groove to have free longitudinal movement, and means extending from the sides of the groove and engaging the insert to limit such free movement.

MICHAEL JOSEPH GALVIN.